(12) United States Patent
Chiba

(10) Patent No.: US 9,988,070 B2
(45) Date of Patent: Jun. 5, 2018

(54) STEERING DEVICE

(71) Applicant: KYB Corporation, Tokyo (JP)

(72) Inventor: Shuhei Chiba, Gifu (JP)

(73) Assignee: KYB Corporation, Tokyo (JP)

( * ) Notice: Subject to any disclaimer, the term of this patent is extended or adjusted under 35 U.S.C. 154(b) by 0 days. days.

(21) Appl. No.: 15/120,739

(22) PCT Filed: Feb. 10, 2015

(86) PCT No.: PCT/JP2015/053675
§ 371 (c)(1),
(2) Date: Aug. 23, 2016

(87) PCT Pub. No.: WO2015/129454
PCT Pub. Date: Sep. 3, 2015

(65) Prior Publication Data
US 2016/0368525 A1    Dec. 22, 2016

(30) Foreign Application Priority Data

Feb. 27, 2014  (JP) ................................ 2014-037332
Feb. 27, 2014  (JP) ................................ 2014-037337
Feb. 27, 2014  (JP) ................................ 2014-037342

(51) Int. Cl.
*B62D 1/19*   (2006.01)
*B62D 1/185*  (2006.01)
*B62D 5/04*   (2006.01)

(52) U.S. Cl.
CPC ............ *B62D 1/195* (2013.01); *B62D 1/185* (2013.01); *B62D 5/04* (2013.01)

(58) Field of Classification Search
CPC ........... B62D 1/195; B62D 1/185; B62D 5/04
See application file for complete search history.

(56) References Cited

U.S. PATENT DOCUMENTS 4,194,411 A * 3/1980 Manabe ................. B62D 1/195
                                                188/376
4,786,076 A * 11/1988 Wierschem ............ B62D 1/195
                                                188/376

(Continued)

FOREIGN PATENT DOCUMENTS

CN    201619599 U    11/2010
JP    54-107019 A     8/1979

(Continued)

*Primary Examiner* — Paul N Dickson
*Assistant Examiner* — Timothy Wilhelm
(74) *Attorney, Agent, or Firm* — Hauptman Ham, LLP

(57) ABSTRACT

A steering device with an impact absorbing mechanism includes an upper column tube configured to support a steering shaft, a lower column tube configured to be movable relative to the upper column tube and an upper fixing bracket to be coupled to the upper column tube and including a cut on the side of a steering wheel. The impact absorbing mechanism includes a bracket fixing portion fixed to the upper fixing bracket, a capsule portion fixed to a vehicle body and engaged with the cut, and a breaking portion connecting the bracket fixing portion and the capsule portion and configured to be broken by relative movements of the upper fixing bracket and the capsule portion. A connected position of the breaking portion to the capsule portion is near a front side of the vehicle body.

18 Claims, 13 Drawing Sheets

(56) References Cited

U.S. PATENT DOCUMENTS

| | | | | |
|---|---|---|---|---|
| 4,884,778 A * | 12/1989 | Yamamoto | B62D 1/195 | 248/548 |
| 4,951,522 A * | 8/1990 | Chowdhury | B62D 1/195 | 188/371 |
| 5,378,021 A * | 1/1995 | Yamaguchi | B62D 1/195 | 188/377 |
| 5,454,453 A * | 10/1995 | Meyer | B60K 17/00 | 180/377 |
| 5,673,937 A * | 10/1997 | Fevre | B62D 1/195 | 280/775 |
| 5,704,254 A * | 1/1998 | Thomas | B62D 1/16 | 403/220 |
| 5,755,461 A * | 5/1998 | Halacka | B62D 1/195 | 280/777 |
| 5,788,279 A * | 8/1998 | Pfannebecker | B62D 1/195 | 280/777 |
| 5,899,116 A * | 5/1999 | Armstrong | B62D 1/195 | 188/376 |
| 6,062,100 A * | 5/2000 | Sarsfield | B62D 1/195 | 188/376 |
| 6,394,241 B1 * | 5/2002 | Desjardins | F16F 7/12 | 188/371 |
| 6,990,874 B2 * | 1/2006 | Murakami | B62D 1/189 | 280/775 |
| 7,455,320 B2 * | 11/2008 | Imamura | B62D 1/195 | 280/777 |
| 7,559,577 B2 * | 7/2009 | Oh | B62D 1/195 | 280/777 |
| 8,480,129 B2 * | 7/2013 | Schlegel | B62D 1/195 | 280/777 |
| 8,523,228 B2 * | 9/2013 | Minamigata | B62D 1/195 | 280/777 |
| 8,585,089 B2 * | 11/2013 | Minamigata | B62D 1/195 | 280/777 |
| 8,678,436 B2 * | 3/2014 | Duffy | B62D 1/195 | 280/777 |
| 8,955,883 B2 * | 2/2015 | Nagase | B62D 1/195 | 280/775 |
| 8,998,259 B2 * | 4/2015 | Morita | B62D 1/189 | 280/777 |
| 9,010,806 B2 * | 4/2015 | Tanaka | B62D 1/195 | 280/777 |
| 9,346,482 B2 * | 5/2016 | Tanaka | B62D 1/195 | |
| 9,359,001 B2 * | 6/2016 | Chiba | B62D 1/195 | |
| 9,359,002 B2 * | 6/2016 | Tanaka | B62D 1/189 | |
| 9,399,483 B2 * | 7/2016 | Okada | F16M 13/02 | |
| 9,511,792 B2 * | 12/2016 | Tanaka | B62D 1/195 | |
| 9,550,513 B2 * | 1/2017 | Fujiwara | B62D 1/195 | |
| 9,604,664 B2 * | 3/2017 | Tanaka | B62D 1/195 | |
| 9,656,684 B2 * | 5/2017 | Tanaka | B62D 1/195 | |
| 2002/0011724 A1 | 1/2002 | Satou et al. | | |
| 2007/0228717 A1 * | 10/2007 | Tanai | B62D 1/195 | 280/777 |
| 2009/0120229 A1 * | 5/2009 | Shibazaki | B62D 1/195 | 74/492 |
| 2011/0239809 A1 * | 10/2011 | Beneker | B62D 1/16 | 74/493 |
| 2012/0169035 A1 * | 7/2012 | Minamigata | B62D 1/195 | 280/777 |
| 2012/0240711 A1 * | 9/2012 | Minamigata | B62D 1/195 | 74/493 |
| 2012/0318092 A1 * | 12/2012 | Kuroumaru | B62D 1/195 | 74/492 |
| 2014/0182409 A1 * | 7/2014 | Nagase | B62D 1/18 | 74/493 |

FOREIGN PATENT DOCUMENTS

| | | |
|---|---|---|
| JP | 9-58485 A | 3/1997 |
| JP | 2002-137743 A | 5/2002 |
| JP | 2004-299606 A | 10/2004 |
| JP | 2007-76613 A | 3/2007 |
| JP | 2010-221952 A | 10/2010 |
| JP | 2013-1242 A | 1/2013 |

\* cited by examiner

STEERING DEVICE

TECHNICAL FIELD

The present invention relates to a steering device to be mounted in a vehicle.

BACKGROUND ART

As a conventional steering device, a steering device with an impact absorbing mechanism for absorbing impact energy generated by the collision of a driver with a steering wheel at the time of a vehicle collision is disclosed in JP2007-76613A.

This steering device includes a bracket for mounting an upper column on a vehicle body and a capsule to be fixed to a flange portion of the bracket. The capsule is provided with a bolt hole and fixed to the vehicle body by inserting a bolt into the bolt hole. Further, the bracket and the capsule are provided with through holes at positions facing each other, and resin pins are formed by injecting resin into these through holes for molding. The bracket is fixed to the capsule by these resin pins.

If a driver collides with the steering wheel and an impact is applied in a direction to slide the bracket relative to the capsule at the time of a vehicle collision, the resin pins are broken to absorb impact energy.

SUMMARY OF INVENTION

However, in the steering device disclosed in JP2007-76613A, the amount and pressure of the resin need to be adjusted in injecting the resin into the through holes to mold the resin pins. This requires an operator's skill and may cause a variation of a load for breaking the resin pins.

The present invention aims to provide a steering device with an impact absorbing mechanism which stably operates at the time of a vehicle collision and does not require an operator's skill during manufacturing.

According to one aspect of the present invention, a steering device with an impact absorbing mechanism for absorbing impact energy applied to a steering shaft through a steering wheel is provided. The steering device includes an upper column tube configured to rotatably support the steering shaft; a lower column tube fixed to a vehicle body, the lower column tube being configured to be movable relative to the upper column tube; and an upper fixing bracket coupled to the upper column tube and including a cut on the steering wheel side. The impact absorbing mechanism includes a bracket fixing portion fixed to the upper fixing bracket; a capsule portion fixed to the vehicle body and engaged with the cut of the upper fixing bracket; and a breaking portion connecting the bracket fixing portion and the capsule portion and configured to be broken by relative movements of the upper fixing bracket and the capsule portion. A connected position of the breaking portion to the capsule portion is near a front side of the vehicle body.

DESCRIPTION OF EMBODIMENTS

Hereinafter, embodiments of the present invention are described with reference to the drawings.

First Embodiment

A first embodiment of the present invention is described, taking an electric power steering device 100 as an example.

Figure 1:
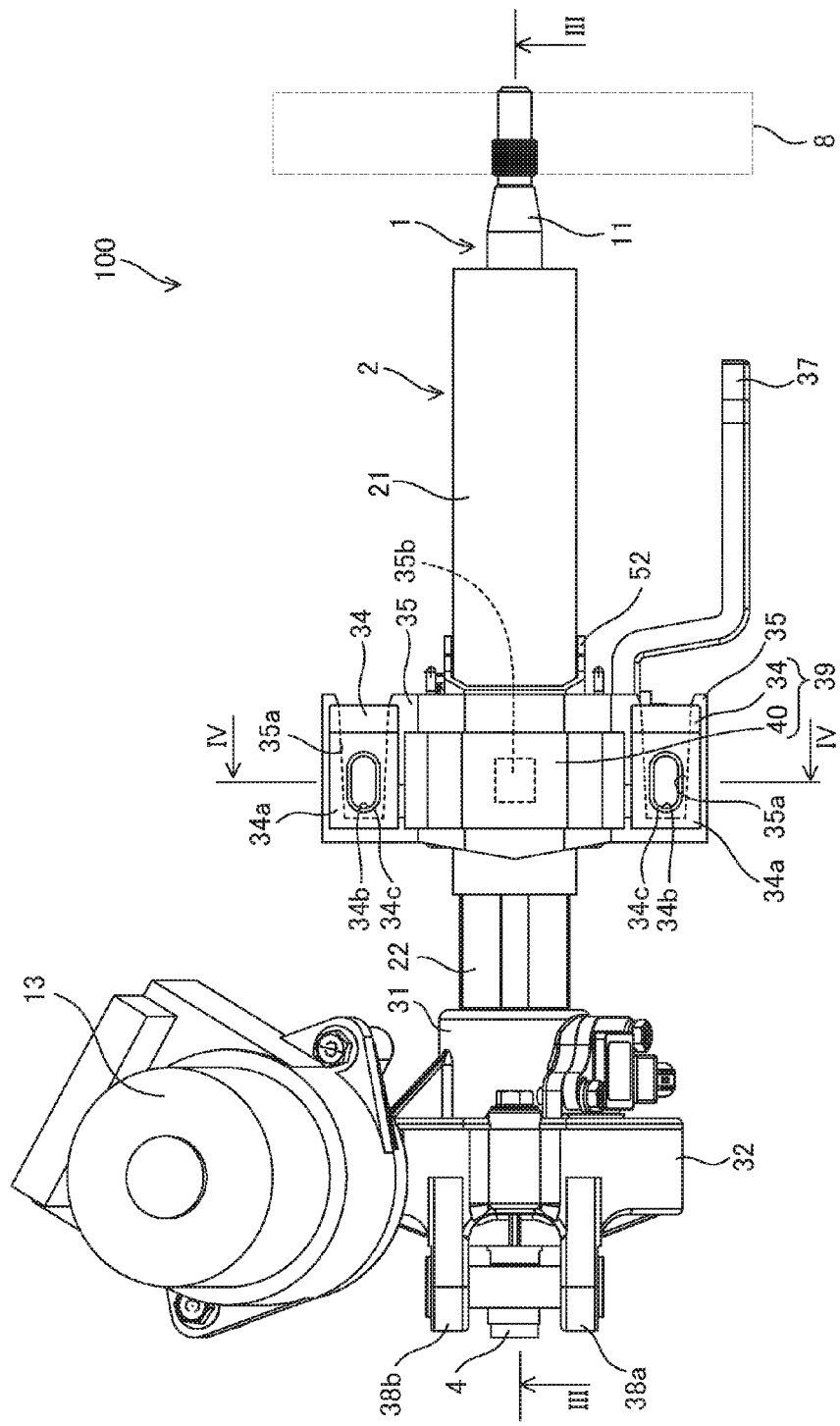
FIG. 1 is a plan view of an electric power steering device according to a first embodiment of the present invention.
Figure 2:
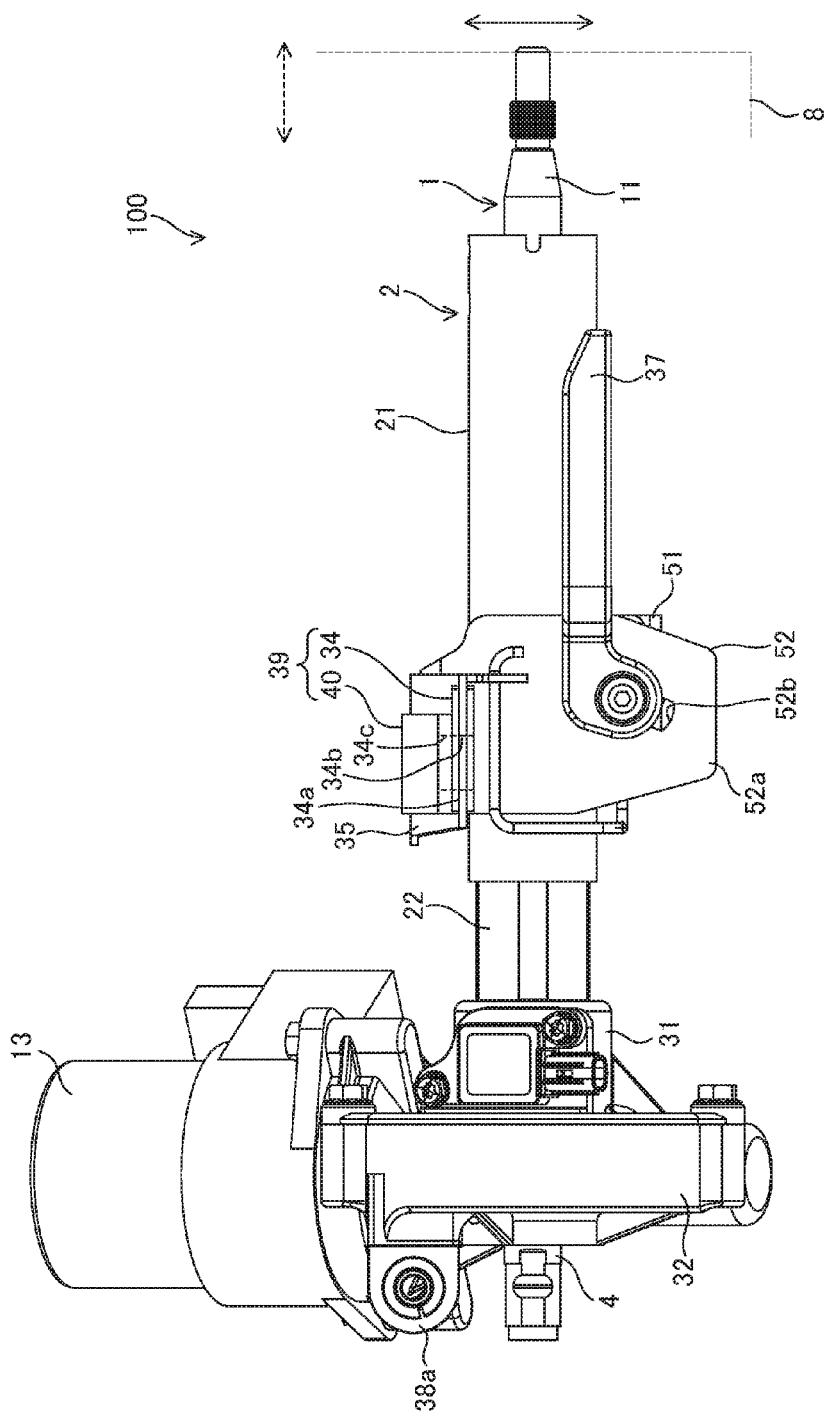
FIG. 2 is a side view of the electric power steering device according to the first embodiment of the present invention.
Figure 3:
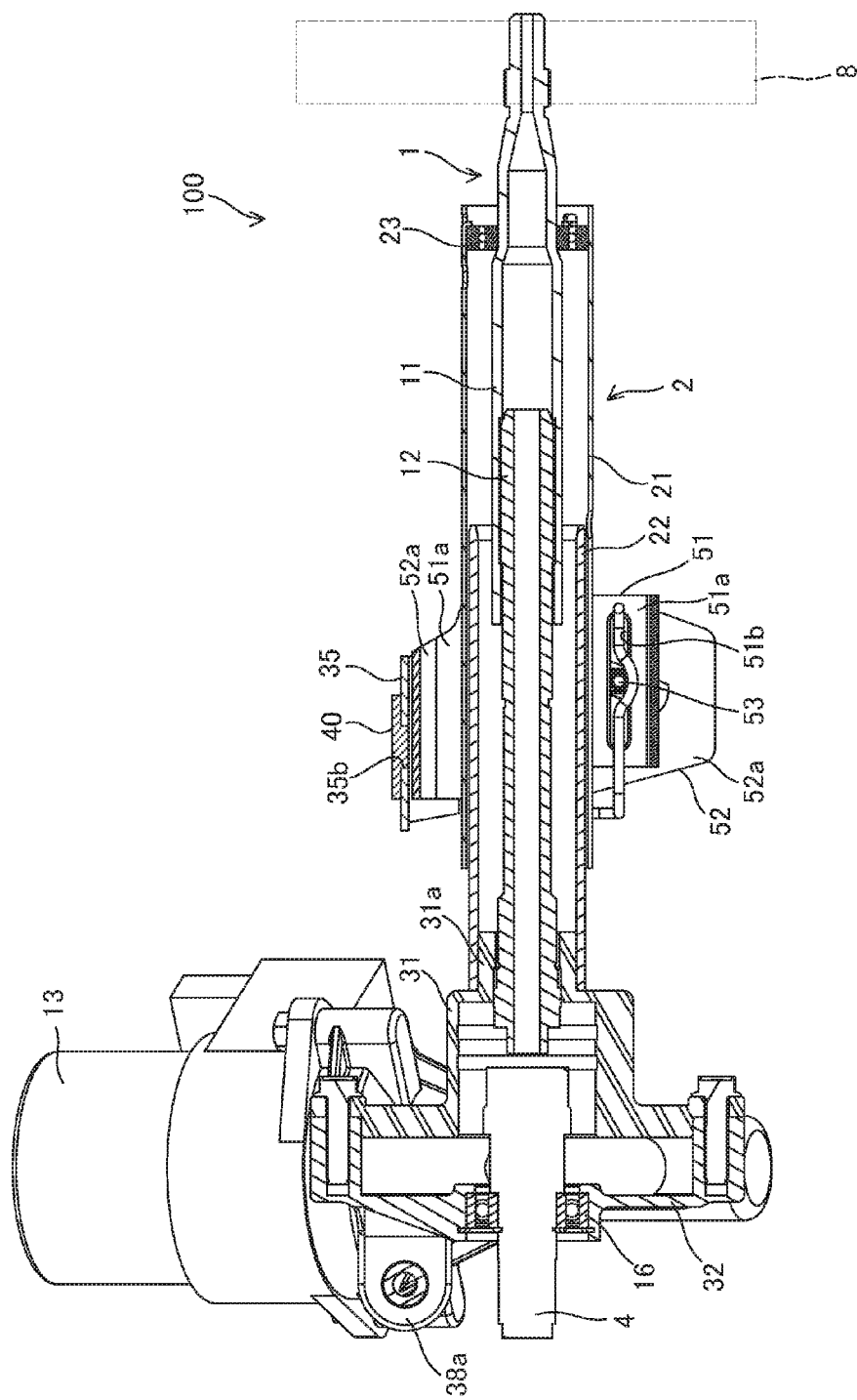
FIG. 3 is a sectional view along line III-III of FIG. 1.

First, the overall configuration of the electric power steering device 100 is described with reference to FIGS. 1 to 3.

The electric power steering device 100 is a device for assisting a steering force applied by a driver to a steering wheel 8 by a rotational torque of an electric motor 13.

The electric power steering device 100 includes a steering shaft 1 having the steering wheel 8 coupled thereto, a steering column 2 rotatably supporting the steering shaft 1 inserted therethrough and an output shaft 4 coupled to the steering shaft 1 via an unillustrated torsion bar.

The output shaft 4 is coupled to wheels via a universal joint, a pinion, a rack and the like. The driver steers the steering wheel 8, whereby the rack moves in an axial direction to change the orientation of the wheels.

In the following description, the side of the steering wheel 8 is referred to as a vehicle body rear side and the side of the output shaft 4 is referred to as a vehicle body front side.

The rotational torque of the electric motor 13 is applied as an assist torque to the output shaft 4 via a speed reducer housed in a gear case 32. The electric motor 13 is controlled on the basis of a detection result of a torque sensor for detecting the steering force applied to the steering wheel 8. The torque sensor is housed in a sensor case 31.

The steering shaft 1 is composed of a substantially cylindrical upper shaft 11 having the steering wheel 8 coupled to a rear end part and a substantially cylindrical lower shaft 12 coaxially connected to the upper shaft 11 and having a front side coupled to the output shaft 4 via the torsion bar. A rear side of the lower shaft 12 is inserted into a hollow part of the upper shaft 11 and the both are serration-connected. The upper shaft 11 and the lower shaft 12 are connected to be integrally rotatable and relatively movable in the axial direction by serration connection.

The steering column 2 is composed of a substantially cylindrical upper column tube 21 for rotatably supporting the upper shaft 11 via a bearing 23, and a substantially cylindrical lower column tube 22 arranged coaxially with the upper column tube 21 and having a front end part fixed to the sensor case 31. A rear side of the lower column tube 22 is inserted into a front side of the upper column tube 21 and the both are relatively movable in the axial direction. The upper shaft 11 and the upper column tube 21 have relative movements in the axial direction regulated by the bearing 23. A tubular small-diameter portion 31a having a smaller diameter than other parts is formed in a rear part of the sensor case 31, and the inner peripheral surface of a front end part of the lower column tube 22 is press-fitted to the outer peripheral surface of the small-diameter portion 31a.

The output shaft 4 is rotatably supported on the gear case 32 via a bearing 16.

The electric power steering device 100 is mounted on a vehicle body via an upper fixing bracket 35 fixed to the vehicle body and configured to support the steering column 2 and an unillustrated lower fixing bracket fixed to the vehicle body and configured to swingably support the gear case 32 via a pair of arms 38a, 38b.

The electric power steering device 100 includes a tilt mechanism for making the steering column 2 swingable about the pair of arms 38a, 38b so that the steering wheel 8 moves in a vertical direction (directions of solid line arrows shown in FIG. 2) when viewed from the driver, a telescopic mechanism for making the steering column 2 telescopic so that the steering wheel 8 moves in a front-back direction (directions of dotted line arrows shown in FIG. 2) when viewed from the driver, and a release mechanism capable of switching between the regulation of swinging and telescopic movements of the steering column 2 and the release of such regulation.

The tilt mechanism, the telescopic mechanism and the release mechanism are described below.

A column bracket 51 is fixed to the upper column tube 21 to surround the outer periphery. The column bracket 51 is supported on a supporting bracket 52 fixed to the upper fixing bracket 35, and coupled to be movable relative to the supporting bracket 52 by a guide pin 53.

The supporting bracket 52 includes a pair of side walls 52a extending to sandwich both side walls 51a of the column bracket 51. The guide pin 53 is provided to penetrate through the both side walls 52a of the supporting bracket 52 and the both side walls 51a of the column bracket 51. The both side walls 52a of the supporting bracket 52 are formed with guide holes 52b for guiding a movement of the guide pin 53. The guide holes 52b are formed in a direction substantially orthogonal to an axial direction of the steering column 2. The guide pin 53 moves along the guide holes 52b, whereby the column bracket 51 moves along the inner peripheral surfaces of the both side walls 52a of the supporting bracket 52. In this way, the steering column 2 swings about the pair of arms 38a, 38b and the steering wheel 8 moves in the vertical direction when viewed from the driver.

Further, the both side walls 51a of the column bracket 51 are formed with guide holes 51b (see FIG. 3) extending in the axial direction of the steering column 2 to guide the movement of the guide pin 53. The guide pin 53 moves along the guide holes 51b, whereby the column bracket 51 moves along the inner peripheral surfaces of the both side walls 52a of the supporting bracket 52. In this way, the upper column tube 21 moves in the axial direction together with the upper shaft 11 and the steering wheel 8 moves in the front-back direction when viewed from the driver.

An operation lever 37 operable by the driver seated in a driver's seat is rotatably attached to the guide pin 53. By operating the operation lever 37, the both side walls 51a of the column bracket 51 are tightened by the both side walls 52a of the supporting bracket 52 and released from tightening. Specifically, the tightening and its release are performed by the action of a cam which rotates according to the operation of the operation lever 37.

When the operation lever 37 is at a tightening position, the both side walls 51a of the column bracket 51 are tightened by the both side walls 52a of the supporting bracket 52 and the movement of the column bracket 51 relative to the supporting bracket 52 is regulated, wherefore the swinging and telescopic movements of the steering column 2 are regulated. On the other hand, when the operation lever 37 is at a releasing position, the tightening of the both side walls 51a of the column bracket 51 by the both side walls 52a of the supporting bracket 52 is released and the movement of the column bracket 51 relative to the supporting bracket 52 is enabled, wherefore the regulation of the swinging and telescopic movements of the steering column 2 is released.

Next, an impact absorbing mechanism 39 is described. The impact absorbing mechanism 39 includes a pair of capsules 34 fixed to the vehicle body via bolts and an impact absorbing member 40 made of resin and is, as shown in FIGS. 1 and 2, fixed to the upper fixing bracket 35.

The upper fixing bracket 35 is formed with cuts 35a open toward the steering wheel 8 and to be engaged with the capsules 34. Engaging grooves 34a to be engaged with the cut 35a are formed on opposite side surfaces of the capsule 34. When the capsules 34 are slid and fitted into the cuts 35a from an opening side, the upper fixing bracket 35 is sandwiched by the capsules 34 and relative movements of the upper fixing bracket 35 and the capsules 34 in a direction perpendicular to an axis of the upper column tube 21 are regulated.

The capsule 34 further includes an insertion hole 34b, through which the bolt for fixing the capsule 34 to the vehicle body is inserted, and a raised portion 34c raised toward the vehicle body side along the outer edge of the insertion hole 34b. The insertion hole 34b and the raised portion 34c are formed substantially in a center of the capsule 34. Further, the upper fixing bracket 35 is formed with a recess 35b recessed downwardly above (upward direction of FIG. 2) the upper column tube 21.

Figure 4:
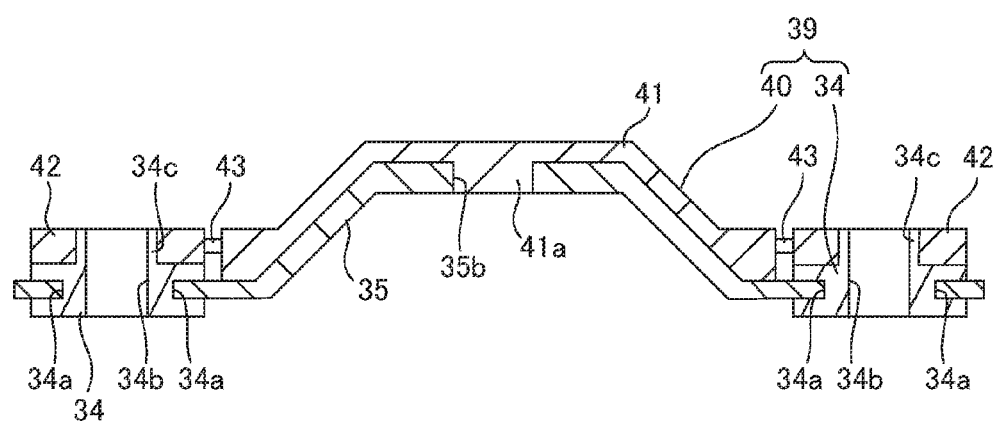
FIG. 4 is a sectional view along line IV-IV of FIG. 1.
Figure 5A:
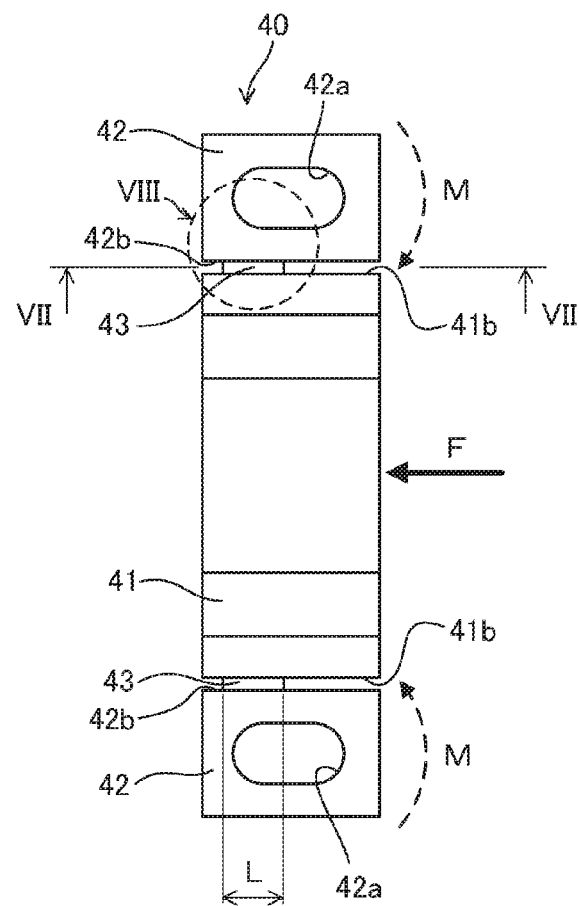
FIG. 5A is a plan view of an impact absorbing member of the electric power steering device according to the first embodiment of the present invention.
Figure 5B:
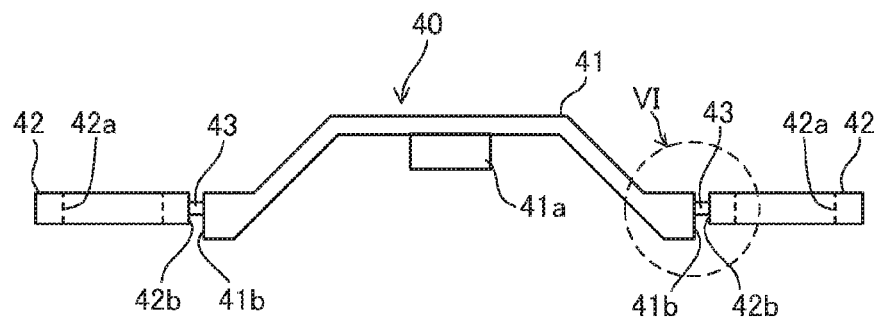
FIG. 5B is a side view when the impact absorbing member of the electric power steering device according to the first embodiment of the present invention is viewed in an axial direction.

Next, the impact absorbing member 40 is described. FIG. 4 is a sectional view along line IV-IV in FIG. 1 and members other than the upper fixing bracket 35 and the impact absorbing mechanism 39 are not shown. FIG. 5A is a plan view of the impact absorbing member 40. FIG. 5B is a side view when the impact absorbing member 40 is viewed in the axial direction of the upper column tube 21.

The impact absorbing member 40 includes a bracket fixing portion 41 having a projection 41a to be fitted into the recess 35b of the upper fixing bracket 35, a pair of capsule fixing portions 42 having through holes 42a whose inner peripheries are to be fitted to the outer peripheries of the raised portions 34c, and breaking portions 43 connecting the bracket fixing portion 41 and the capsule fixing portions 42, and is integrally molded of resin.

By integrally fixing the bracket fixing portion 41 to the upper fixing bracket 35 and integrally fixing the capsule fixing portions 42 to the capsules 34, the impact absorbing member 40 is fixed to the upper fixing bracket 35. Here, an integral part of the capsule 34 and the capsule fixing portion 42 corresponds to a capsule portion.

As shown in FIGS. 5A and 5B, the breaking portion 43 connects a part of a connection surface 42b of the capsule fixing portion 42 near the vehicle body front side and a part of a connection surface 41b of the bracket fixing portion 41 near the vehicle body front side over a predetermined area in a front-back direction of the vehicle body. Specifically, the part of the connection surface 42b of the capsule fixing portion 42 near the vehicle body front side serves as a connection area to which the breaking portion 43 is to be connected, whereas a part near the vehicle body rear side serves as a non-connection area to which the breaking portion 43 is not to be connected. That the breaking portion 43 is connected to the part of the connection surface 42b of the capsule fixing portion 42 near the vehicle body front side means that the breaking portion 43 is connected to the capsule fixing portion 42 in a state where a middle point of the breaking portion 43 in the vehicle body front-back direction is located closer to the vehicle body front side in the vehicle body front-back direction than a center of a tightening position by the bolt inserted through the through hole 42a of the capsule fixing portion 42. Further, as shown in FIG. 5B, the breaking portions 43 are formed to be thinner than the capsule fixing portions 42 and the capsule fixing portion 41 and shaped to be more easily broken than other parts.

Next, the action of the impact absorbing mechanism 39 is described.

If an excessive load acts on the steering shaft 1 through the steering wheel 8 at the time of a vehicle collision, the upper shaft 11 and the upper column tube 21 integrally move in the axial direction and the guide pin 53 moves until coming into contact with ends of the guide holes 51b (stroke end of a telescopic adjusting mechanism). Further, the above load acts on the upper fixing bracket 35 from the upper column tube 21 via the column bracket 51 and the supporting bracket 52. When the load acts on the upper fixing bracket 35, the upper fixing bracket 35 tries to move in a direction to disengage the cuts 35c from the engaging grooves 34a of the capsules 34, i.e. in a direction opposite to the steering wheel 8. At this time, the capsule fixing portions 42 fixed to the capsules 34 and the bracket fixing portion 41 fixed to the upper fixing bracket 35 relatively move to break the breaking portions 43. In this way, when an excessive load acts on the steering wheel 8 at the time of a vehicle collision, the upper column tube 21 and the upper shaft 11 move relative to the vehicle body to absorb impact energy applied to the upper shaft 11.

Specifically, the capsule fixing portions 42 are fixed to the vehicle body by the bolts inserted through the through holes 42a. Thus, if a load acts on the bracket fixing portion 41 via the upper fixing bracket 35 as shown by a solid line arrow F in FIG. 5A, the load is transmitted also to the capsule fixing portions 42 via the breaking portions 43 connected to the vehicle body front parts of the capsule fixing portions 42 and moments act about the tightening positions by the bolts on the capsule fixing portions 42. Thus, as shown by broken line arrows M in FIG. 5A, the vehicle body rear parts of the capsule fixing portions 42 move toward the bracket fixing portion 41, whereas the vehicle body front parts of the capsule fixing portions 42 move in directions away from the bracket fixing portion 41.

Here, as described above, the non-connection area to which the breaking portion 43 is not to be connected is provided on the vehicle body rear part of the connection surface 42b of the capsule fixing portion 42. Thus, as shown in FIG. 5A, a clearance is formed between the vehicle body rear part of the capsule fixing portion 42 and the bracket fixing portion 41. This clearance serves as a space for allowing a displacement of the capsule fixing portion 42 and the vehicle body rear part of the capsule fixing portion 42 moves toward the bracket fixing portion 41 without being subject to restrictions.

As the vehicle body rear part of the capsule fixing portion 42 moves toward the bracket fixing portion 41, the breaking portion 43 connected to the vehicle body front part of the capsule fixing portion 42 starts being broken and is stably broken according to the load acting on the capsule fixing portion 42. When the breaking portion 43 is completely broken, the capsule fixing portion 42 and the capsule 34 stay at fixed positions since being fixed to the vehicle body by the bolts, whereas the bracket fixing portion 41 moves toward the front side of the vehicle body together with the upper fixing bracket 35 since being locked to the upper fixing bracket 35 via the projection 41a.

The load for breaking the breaking portion 43 changes according to the size of the non-connection area, i.e. the connected position of the breaking portion 43 to the capsule fixing portion 42. For example, if it is desired to reduce a breaking load, the connected position of the breaking portion 43 to the capsule fixing portion 42 is shifted toward the vehicle front side to make the non-connection area larger so that the vehicle body rear part of the capsule fixing portion 42 easily moves toward the bracket fixing portion 41 when a load acts.

Figure 6:
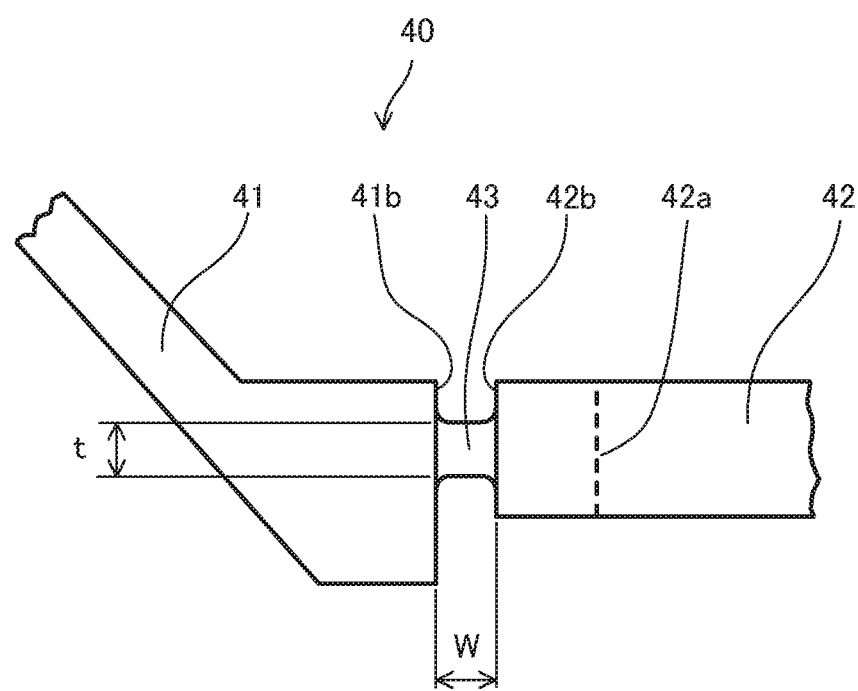
FIG. 6 is an enlarged view enlargedly showing a part VI of FIG. 5B.

Next, a technique for setting the breaking load of the breaking portion 43 is described with reference to FIGS. 5A to 6. FIG. 6 is an enlarged view of a peripheral part (within a broken line circle VI) of the breaking portion 43 in FIG. 5B.

The shape of the breaking portion 43 is specified by a length L in the vehicle body front-back direction shown in FIG. 5A, a distance W between the connection surface 41b of the bracket fixing portion 41 and the connection surface 42b of the capsule fixing portion 42 (hereinafter, referred to as a width W) shown in FIG. 6, and a thickness t in a direction of fixing the upper fixing bracket 35 and the impact absorbing mechanism 39 to the vehicle body by the bolts.

The load for breaking the breaking portion 43 is set on the basis of the length L, the width W and the thickness t of the breaking portion 43. For example, if the length L or the thickness t of the breaking portion 43 is increased, an area connecting the capsule fixing portion 42 and the bracket fixing portion 41 is enlarged, wherefore the breaking portion 43 becomes less likely to break and the breaking load becomes larger. On the other hand, if the width W of the breaking portion 43 is increased, the clearance between the capsule fixing portion 42 and the bracket fixing portion 41 becomes large and the capsule fixing portion 42 more easily moves toward the bracket fixing portion 41 when a load acts, wherefore the breaking load becomes smaller. As just described, the breaking load can be arbitrarily set by appropriately changing each dimension of the breaking portion 43 and changing the shape of the breaking portion 43.

Figure 7:
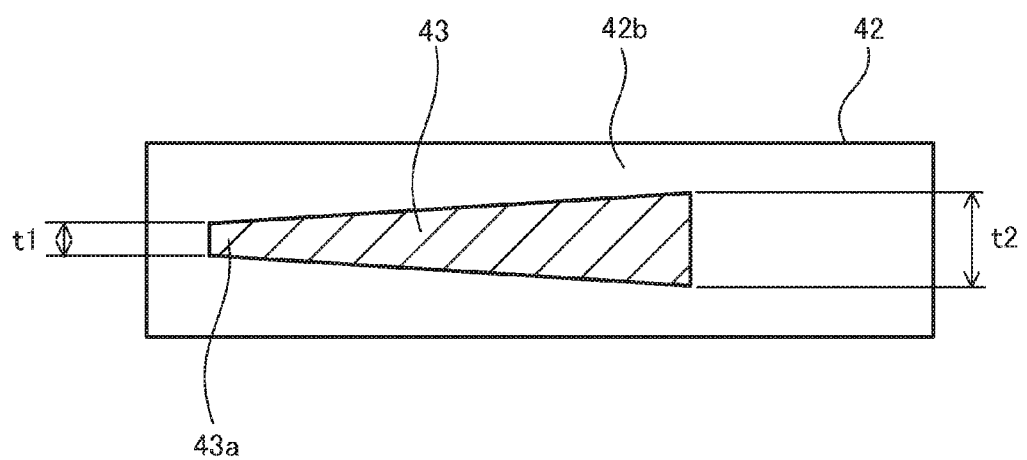
FIG. 7 is a sectional view along line VII-VII of FIG. 5A.
Figure 8:
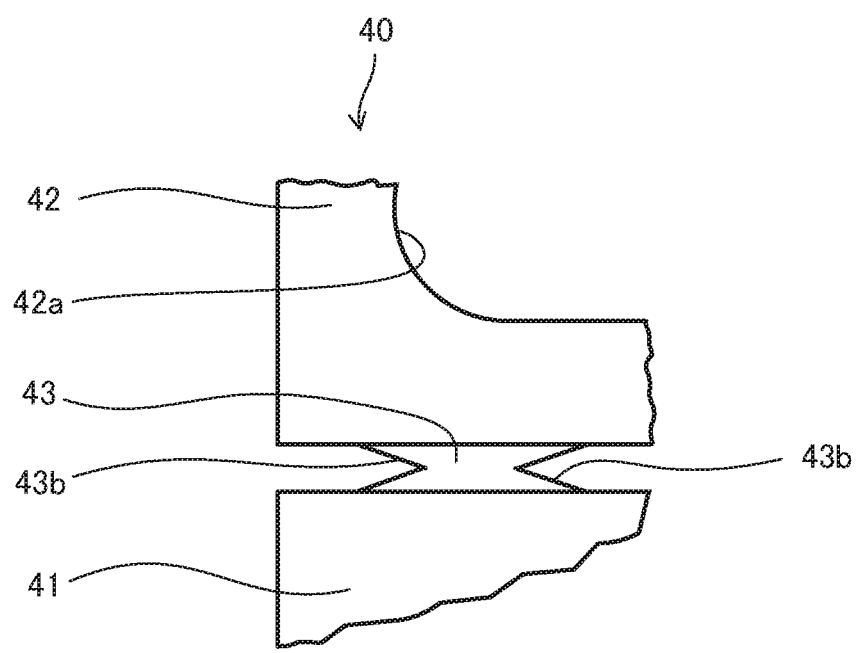
FIG. 8 is an enlarged view enlargedly showing a part VIII of FIG. 5A.

Next, another technique for setting the breaking load of the breaking portion 43 is described with reference to FIGS. 7 and 8. FIG. 7 is a sectional view along line VII-VII in FIG. 5A. FIG. 8 is an enlarged view of a peripheral part (within a broken line circle VIII) of the breaking portion 43 in FIG. 5A.

Breaking portions 43 shown in FIGS. 7 and 8 include brittle portions more likely to break than other parts of the breaking portion 43. The breaking portion 43 shown in FIG.

7 has a thickness t reduced from t2 to t1 from the vehicle body rear side toward the vehicle body front side, and a thinned portion 43a as a brittle portion more likely to break because of being thinner than the other parts is formed on a vehicle body front part of the breaking portion 43. When a load acts, the vehicle body front part of the capsule fixing portion 42 moves in the direction away from the bracket fixing portion 41 as described above. Thus, the breaking portion 43 is easily broken from the thinned portion 43a formed on the vehicle body front part. Therefore, the breaking load can be arbitrarily set by appropriately changing the thickness of the thinned portion 43a or a position where the thinned portion 43a is formed. Without being limited to the vehicle body front side, the thinned portion 43a may be provided on the vehicle body rear side or may be provided on both the vehicle body front side and the vehicle body rear side or may be formed by making a central part thinner than the vehicle body front part and the vehicle body rear part. Further, the thickness of the breaking portion 43 may be gradually reduced toward the thinned portion 43a or may be reduced in a stepwise manner.

Wedge-shaped cut portions 43b as brittle portions more likely to break than other parts are formed on end parts of the breaking portion 43 shown in FIG. 8 in the vehicle body front-back direction. When a load acts, the vehicle body front part of the capsule fixing portion 42 moves in the direction away from the bracket fixing portion 41 as described above. Thus, the breaking portion 43 is easily broken from the cut portions 43b. Therefore, the breaking load can be arbitrarily set by appropriately changing cutting depths of the cut portions 43b. The cut portion 43b may be formed only on either one of the end parts. Further, the cut portion 43b may have a U shape or a semicircular shape instead of a wedge shape.

According to the above embodiment, the following effects are exhibited.

By providing the breaking portion 43 on the part of the capsule portion 34, 42 near the vehicle body front side, the capsule portion 34, 42 is more easily displaced according to an impact acting on the steering device. As the capsule portion 34, 42 is displaced, the breaking portion 43 connected to the capsule portion 34, 42 is stably broken. Thus, without requiring an operator's skill, it is possible to manufacture the steering device 100 with the impact absorbing mechanism 39 which stably operates at the time of a vehicle collision.

Further, since the capsule fixing portion 42 is fixed to the capsule 34 by fitting the through hole 42a of the capsule fixing portion 42 to the raised portion 34c of the capsule 34, the impact absorbing member 40 can be fixed to the capsule 34 by a simple structure. Further, since the capsule fixing portion 42 is fixed by the bolt for fixing the capsule to the vehicle body, the detachment of the capsule fixing portion 42 can be more reliably prevented.

Further, since the impact absorbing member 40 is made of resin and the bracket fixing portion 41, the capsule fixing portions 42 and the breaking portions 43 are integrally molded, the manufacturing cost of the impact absorbing member 40 can be suppressed.

Further, since the load for breaking the breaking portion 43 changes depending on the connected position of the breaking portion 43 to the capsule fixing portion 42, the breaking load can be appropriately set by changing the connected position.

Further, since the load for breaking the breaking portion 43 is set on the basis of a cross-sectional shape of the breaking portion 43, it is possible to provide the steering device 100 with the impact absorbing mechanism 39 capable of arbitrarily adjusting the breaking load without requiring an operator's skill.

Further, the load for breaking the breaking portion 43 can be arbitrarily adjusted by appropriately changing the length, the width and the thickness of the breaking portion 43. Further, the load for breaking the breaking portion 43 can be arbitrarily adjusted by changing the thickness of the breaking portion 43 in the vehicle front-back direction. Further, the load for breaking the breaking portion 43 can be arbitrarily adjusted by forming the cut portion(s) 43b on the end part(s) of the breaking portion 43 in the vehicle front-back direction.

Further, since the breaking portion 43 for determining the breaking load of the impact absorbing mechanism 39 is molded between the bracket fixing portion 41 and the capsule fixing portion 42 and not directly molded on the upper fixing bracket 35 or the like, the breaking load can be stabilized without being affected by the processing accuracy of the upper fixing bracket 35 and the like.

Further, since the breaking portion 43 that affects the breaking load is in a state where the shape thereof is visible during manufacturing, the presence or absence of a product abnormality and the breaking load can be easily determined on the basis of the appearance, the dimensions and the like of the breaking portion 43 and quality can be stabilized.

Figure 9:
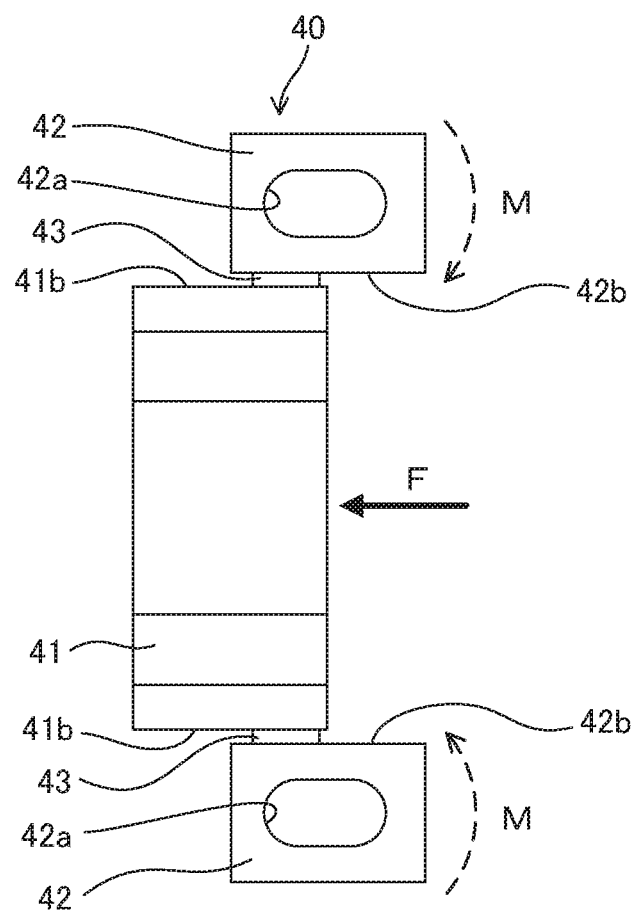
FIG. 9 is a plan view of a modification of the impact absorbing member.

Next, a modification of the impact absorbing member 40 is described with reference to FIG. 9. FIG. 9 is a plan view of the modification of the impact absorbing member 40.

The modification shown in FIG. 9 differs from the impact absorbing member 40 shown in FIG. 5A in that the breaking portion 43 is connected to the capsule fixing portion 42 on the part of the connection surface 42b near the vehicle body front side, but connected to the bracket fixing portion 41 on the part of the connection surface 41b near the vehicle body rear side. The positions of the recess 35b and the cuts 35a of the upper fixing bracket 35 are appropriately changed in accordance with the shape of the impact absorbing member 40 shown in FIG. 9.

Also in the modification shown in FIG. 9, when a load indicated by a solid line arrow F acts on the bracket fixing portion 41, a moment acts on the capsule fixing portion 42 in the same direction as in the case shown in FIG. 5A and a vehicle rear part of the capsule fixing portion 42 moves toward the bracket fixing portion 41 as indicated by a broken line arrow M. Thus, also in the modification, the breaking portion 43 is stably broken according to the load acting on the capsule fixing portion 42.

Further, in the modification, the bracket fixing portion 41 is not arranged at a position facing the vehicle rear part of the capsule fixing portion 42. Thus, when the vehicle rear part of the capsule fixing portion 42 moves toward the bracket fixing portion 41, there is nothing to limit that movement, wherefore the breaking portion 43 is more stably broken.

In the modification, the breaking portion 43 is connected to the bracket fixing portion 41 on the part of the connection surface 41b near the vehicle body rear side. Instead of this, the breaking portion 43 may be connected to a middle part of the connection surface 41b in the vehicle body front-back direction. If the breaking portion 43 is connected to the part of the connection surface 42b of the capsule fixing portion 42 near the vehicle body front side and a space for allowing a movement of the vehicle rear part of the capsule fixing portion 42 toward the bracket fixing portion 41 is ensured, the breaking portion 43 is stably broken.

Second Embodiment

Figure 10:
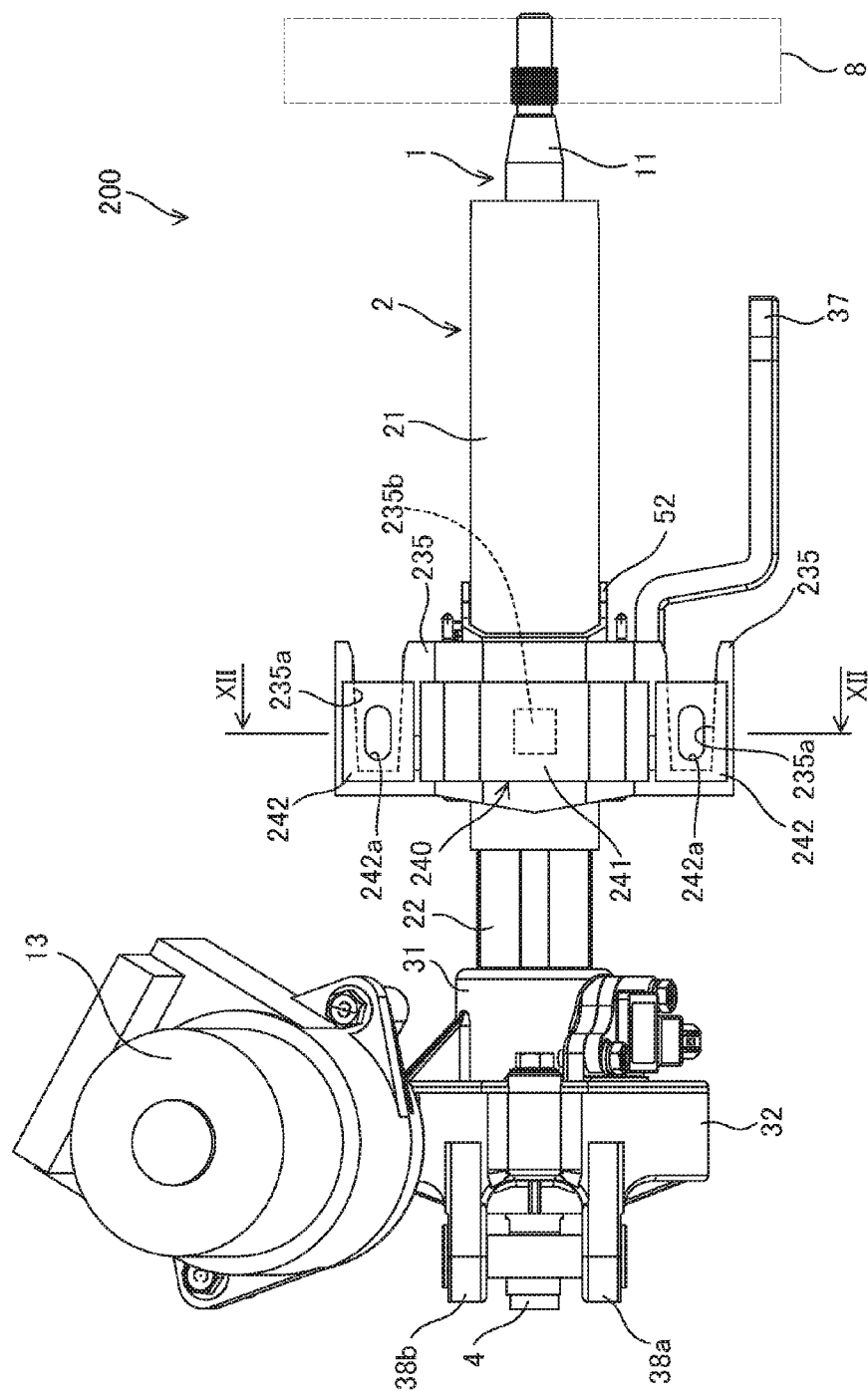
FIG. 10 is a plan view of an electric power steering device according to a second embodiment of the present invention.
Figure 11:
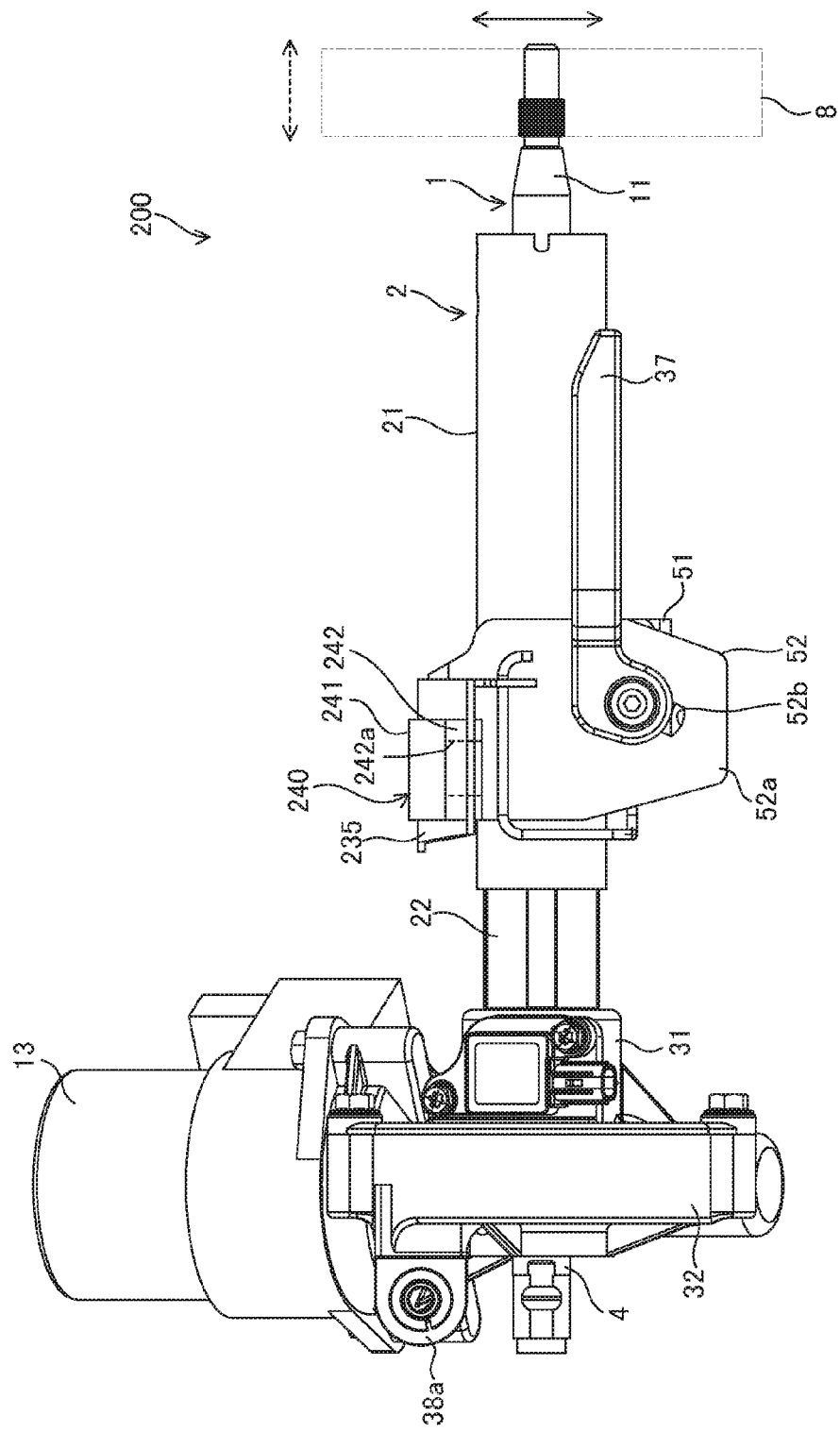
FIG. 11 is a side view of the electric power steering device according to the second embodiment of the present invention.
Figure 12:
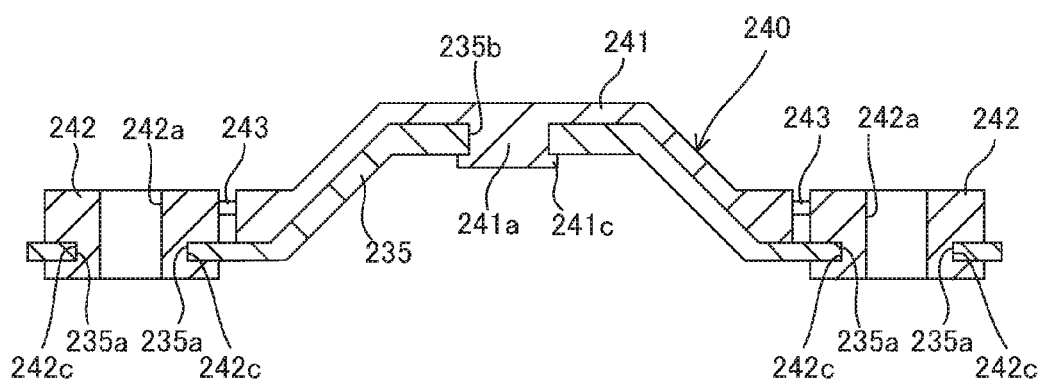
FIG. 12 is a sectional view showing a cross-section along line XII-XII in FIG. 10.
Figure 13:
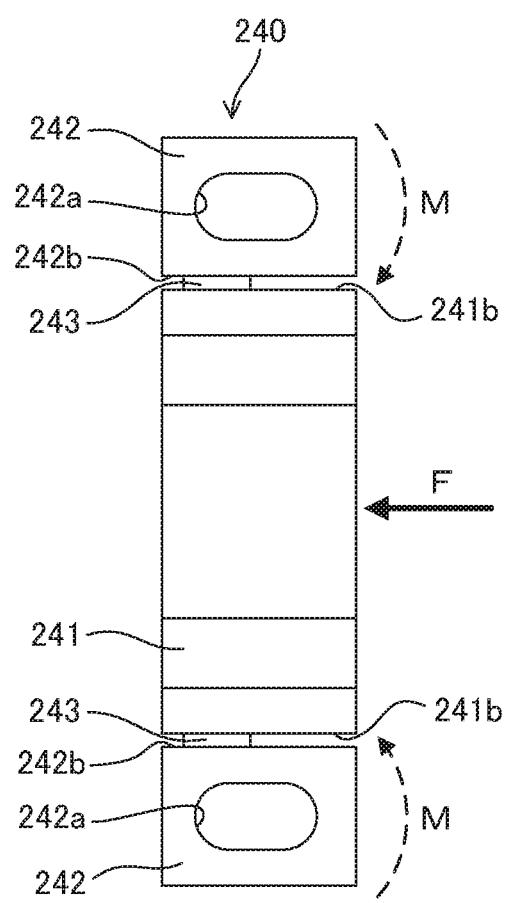
FIG. 13 is a plan view of an impact absorbing mechanism of the electric power steering device according to the second embodiment of the present invention.

Next, an electric power steering device 200 according to a second embodiment of the present invention is described with reference to FIGS. 10 to 13. The following description is centered on points of difference from the first embodiment and components similar to those of the first embodiment are denoted by the same reference signs and not described. FIG. 10 is a plan view of the electric power steering device 200, and FIG. 11 is a side view of the electric power steering device 200. FIG. 12 is a sectional view along line XII-XII of FIG. 10, and members other than an upper fixing bracket 235 and an impact absorbing mechanism 240 are not shown. FIG. 13 is a plan view of the impact absorbing mechanism 240.

A basic configuration of the electric power steering device 200 is similar to that of the electric power steering device 100 according to the first embodiment. The electric power steering device 200 differs from the electric power steering device 100 in that the impact absorbing mechanism 240 is integrally formed. That is, although the impact absorbing mechanism 39 includes the impact absorbing member 40 and the capsules 34 in the electric power steering device 100, these are integrally formed as the impact absorbing mechanism 240 in the electric power steering device 200.

The upper fixing bracket 235 to which the impact absorbing mechanism 240 is to be fixed includes a pair of cut portions 235a open toward a steering wheel 8. Further, the upper fixing bracket 235 includes a through hole 235b formed above (upward direction of FIG. 11) an upper column tube 21 and vertically penetrating through the upper fixing bracket 235. The through hole 235b may have a rectangular shape as shown in FIG. 10 or may have a circular shape. Further, there may be one or more through hole(s) 235b.

The impact absorbing mechanism 240 includes a bracket fixing portion 241 to be fixed to the upper fixing bracket 235, a pair of capsule portions 242 molded on the cut portions 235a of the upper fixing bracket 235, and breaking portions 243 connecting the bracket fixing portion 241 and the capsule portions 242, and is integrally molded of resin. The impact absorbing mechanism 240 is formed on the upper fixing bracket 235, for example, by injection molding. A forming method of the impact absorbing mechanism 240 is not limited to this and another forming method may be adopted.

The bracket fixing portion 241 includes a retaining portion 241a to be locked to the through hole 235b of the upper fixing bracket 235. By the retaining portion 241a, the bracket fixing portion 241 and the upper fixing bracket 235 are integrally configured and not separated even when being subjected to an impact.

As shown in FIG. 12, the retaining portion 241a of the bracket fixing portion 241 is not only located in the through hole 235b, but also may include a bulging portion 241c bulging outwardly of the through hole 235b and having a cross-section larger than that of the through hole 235b. By forming the bulging portion 241c, the bracket fixing portion 241 is reliably fixed to the upper fixing bracket 235. According to required fixing strength, the sizes and the numbers of the retaining portion(s) 241a and the through hole(s) 235b are appropriately set.

As shown in FIGS. 10 and 12, the capsule portions 242 are injection-molded to sandwich parts of the cut portions 235a of the upper fixing bracket 235 excluding opening ends on the side of the steering wheel 8, and include engaging grooves 242c extending in the front-back direction of the vehicle body in parts corresponding to the cut portions 235a. Further, the capsule portions 242 include insertion holes 242a which are formed in parts enclosed by the engaging grooves 242c and through which bolts for fixing the electric power steering device 200 to the vehicle body are inserted. The insertion holes 242a are formed into long holes to adjust the mounted positions of the bolts. The shape of the insertion holes 242a is not limited to this and may be circular. Further, collar members made of metal may be provided in the insertion holes 242a for reinforcement.

As shown in FIG. 13, the breaking portion 243 connects a part of a connection surface 242b of the capsule portion 242 near a vehicle body front side and a part of a connection surface 241b of the bracket fixing portion 241 near the vehicle body front side over a predetermined area in the front-back direction of the vehicle body. Specifically, the part of the connection surface 242b of the capsule portion 242 near the vehicle body front side serves as a connection area to which the breaking portion 243 is to be connected, whereas a part near a vehicle body rear side serves as a non-connection area to which the breaking portion 243 is not to be connected. That the breaking portion 243 is connected to the part of the connection surface 242b of the capsule portion 242 near the vehicle body front side means that the breaking portion 243 is connected to the capsule portion 242 in a state where a middle point of the breaking portion 243 in the vehicle body front-back direction is located closer to the vehicle body front side in the vehicle body front-back direction than a center of a tightening position by the bolt inserted through the through hole 242a of the capsule portion 242. Further, as shown in FIG. 12, the breaking portions 243 are formed to be thinner than the capsule portions 242 and the capsule fixing portion 241 and shaped to be more easily broken than other parts.

The action of the impact absorbing mechanism 240 is not described since being the same as that of the impact absorbing mechanism 39 in the first embodiment.

According to the above second embodiment, the following effects are exhibited.

Since the breaking portion 243 to be broken by an impact and the capsule portions 242 to be fixed to the vehicle are integrally molded members, manufacturing cost can be reduced as compared to the case where these are manufactured by separate members. Further, since the capsules formed mainly of metal are not necessary, the weight of the device can be reduced.

Embodiments of the present invention were described above, but the above embodiments are merely examples of applications of the present invention, and the technical scope of the present invention is not limited to the specific constitutions of the above embodiments.

For example, although the electric power steering device 100 has been described in the above embodiment, the present invention can be applied also to hydraulic power steering devices and also to steering devices which do not assist a steering force applied to the steering wheel 8 by a driver.

Further, although the impact absorbing member 40 and the impact absorbing mechanism 240 are made of resin in the above embodiments, they may be made of another material.

Further, although the impact absorbing member 40 fitted respectively to the upper fixing bracket 35 and the capsules 34, which relatively move at the time of a vehicle collision, is broken at the time of a vehicle collision to absorb an impact in the above embodiment, other impact absorbing mechanisms may be combined.

For example, a configuration for absorbing an impact by the plastic or shear deformation of both serrations due to relative movements of the lower shaft 12 and the upper shaft 11 at the time of a vehicle collision may be combined by forming the serrations on the outer periphery of the lower shaft 12 and the inner periphery of the upper shaft 11 and forming the lower shaft 12 into such a tapered shape that an outer diameter increases toward the bottom in the axial direction.

Further, a configuration for absorbing an impact by the drawing of an S-shaped plate according to relative movements of the upper column tube 21 and the lower column tube 22 at the time of a vehicle collision may be combined, for example, by coupling the side of the upper column tube 21 and the side of the lower column tube 22 by the S-shaped plate.

This application claims priority based on Japanese Patent Applications No. 2014-037332, No. 2014-037337 and No. 2014-037342 filed with the Japan Patent Office on Feb. 27, 2014, the entire contents of which are incorporated into this specification.

The invention claimed is:

1. A steering device with an impact absorbing mechanism for absorbing impact energy applied to a steering shaft through a steering wheel, comprising:
   an upper column tube configured to rotatably support the steering shaft;
   a lower column tube fixed to a vehicle body, the lower column tube being configured to be movable relative to the upper column tube; and
   an upper fixing bracket coupled to the upper column tube and including a cut on the steering wheel side;
   the impact absorbing mechanism including:
   a bracket fixing portion fixed to the upper fixing bracket;
   a capsule portion fixed to the vehicle body and engaged with the cut of the upper fixing bracket; and
   a breaking portion connecting the bracket fixing portion and the capsule portion and configured to be broken by relative movements of the upper fixing bracket and the capsule portion;
   wherein a position where the breaking portion is connected to the capsule portion is near a front side of the capsule portion in a front-back direction of the vehicle body.

2. The steering device according to claim 1, wherein:
   a load for breaking the breaking portion is set on the basis of the connected position where the breaking portion is to the capsule portion.

3. The steering device according to claim 1, wherein:
   a load for breaking the breaking portion is set on the basis of the shape of the breaking portion.

4. The steering device according to claim 3, wherein:
   the load for breaking the breaking portion is set on the basis of a length L, a width W and a thickness t of the breaking portion specifying the shape of the breaking portion.

5. The steering device according to claim 3, wherein:
   the breaking portion includes a brittle portion more likely to break than other parts of the breaking portion.

6. The steering device according to claim 5, wherein:
   the brittle portion is a thinned portion thinner than the other parts of the breaking portion.

7. The steering device according to claim 5, wherein:
   the brittle portion is a cut portion formed on either one or both of a vehicle body front side and a vehicle body rear side of the breaking portion.

8. The steering device according to claim 1, wherein:
   the capsule portion includes:
   a capsule fixed to the vehicle body and engaged with the cut of the upper fixing bracket; and
   a capsule fixing portion connected to the bracket fixing portion via the breaking portion and fitted to the capsule.

9. The steering device according to claim 1, wherein:
   the bracket fixing portion, the capsule portion and the breaking portion are integrally molded.

10. The steering device according to claim 9, wherein:
    the bracket fixing portion includes a retaining portion locked to a through hole penetrating through the upper fixing bracket.

11. The steering device according to claim 9, wherein:
    the impact absorbing mechanism is made of resin.

12. A steering device with an impact absorbing mechanism for absorbing impact energy applied to a steering shaft through a steering wheel, comprising:
    an upper column tube configured to rotatably support the steering shaft;
    a lower column tube fixed to a vehicle body, the lower column tube being configured to be movable relative to the upper column tube; and
    an upper fixing bracket coupled to the upper column tube and including a cut on the steering wheel side;
    the impact absorbing mechanism including:
    a bracket fixing portion fixed to the upper fixing bracket;
    a capsule portion fixed to the vehicle body and engaged with the cut of the upper fixing bracket; and
    a breaking portion connecting the bracket fixing portion and the capsule portion and configured to be broken by relative movements of the upper fixing bracket and the capsule portion; and
    a connected position of the breaking portion to the capsule portion being near a front side of the vehicle body, wherein
    a load for breaking the breaking portion is set on the basis of
    the connected position of the breaking portion to the capsule portion, or
    the shape of the breaking portion.

13. The steering device according to claim 12, wherein:
    the load for breaking the breaking portion is set on the basis of the shape of the breaking portion.

14. The steering device according to claim 13, wherein:
    the load for breaking the breaking portion is set on the basis of a length L, a width W and a thickness t of the breaking portion specifying the shape of the breaking portion.

15. The steering device according to claim 13, wherein:
    the breaking portion includes a brittle portion more likely to break than other parts of the breaking portion.

16. The steering device according to claim 15, wherein:
    the brittle portion is a thinned portion thinner than the other parts of the breaking portion.

17. The steering device according to claim 15, wherein:
    the brittle portion is a cut portion formed on either one or both of a vehicle body front side and a vehicle body rear side of the breaking portion.

18. A steering device with an impact absorbing mechanism for absorbing impact energy applied to a steering shaft through a steering wheel, comprising:

an upper column tube configured to rotatably support the steering shaft;
a lower column tube fixed to a vehicle body, the lower column tube being configured to be movable relative to the upper column tube; and
an upper fixing bracket coupled to the upper column tube and including a cut on the steering wheel side;
the impact absorbing mechanism including:
a bracket fixing portion fixed to the upper fixing bracket;
a capsule portion fixed to the vehicle body and engaged with the cut of the upper fixing bracket; and
a breaking portion connecting the bracket fixing portion and the capsule portion and configured to be broken by relative movements of the upper fixing bracket and the capsule portion; and
a connected position of the breaking portion to the capsule portion being near a front side of the vehicle body, wherein
the bracket fixing portion, the capsule portion and the breaking portion are integrally molded, and
the bracket fixing portion includes a retaining portion locked to a through hole penetrating through the upper fixing bracket.

\* \* \* \* \*